(12) United States Patent
Aloni et al.

(10) Patent No.: US 8,244,906 B2
(45) Date of Patent: *Aug. 14, 2012

(54) METHOD AND SYSTEM FOR TRANSPARENT TCP OFFLOAD (TTO) WITH A USER SPACE LIBRARY

(75) Inventors: Eliezer Aloni, Zur Yigal (IL); Uri El Zur, Irvine, CA (US); Rafi Shalom, Givat Shmuel (IL); Caitlin Bestler, Laguna Hills, CA (US)

(73) Assignee: Broadcom Israel Research, Ltd, Ramat Gan (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/164,166

(22) Filed: Jun. 20, 2011

(65) Prior Publication Data

US 2011/0246666 A1 Oct. 6, 2011

Related U.S. Application Data

(63) Continuation of application No. 12/566,064, filed on Sep. 24, 2009, now Pat. No. 7,966,417, which is a continuation of application No. 11/489,300, filed on Jul. 18, 2006, now Pat. No. 7,596,628.

(60) Provisional application No. 60/796,377, filed on May 1, 2006.

(51) Int. Cl.
*G06F 15/16* (2006.01)
(52) U.S. Cl. ...................................... 709/235; 370/235
(58) Field of Classification Search .......... 709/235–241; 370/235
See application file for complete search history.

(56) References Cited

U.S. PATENT DOCUMENTS

| 7,003,586 | B1 * | 2/2006 | Bailey et al. | 709/250 |
| 7,284,070 | B2 * | 10/2007 | Boucher et al. | 709/250 |
| 7,441,006 | B2 * | 10/2008 | Biran et al. | 709/212 |
| 2002/0071436 | A1 * | 6/2002 | Border et al. | 370/395.32 |
| 2005/0021660 | A1 * | 1/2005 | San Andres et al. | 709/216 |
| 2005/0108518 | A1 * | 5/2005 | Pandya | 713/151 |

* cited by examiner

*Primary Examiner* — Abdullahi Salad
(74) *Attorney, Agent, or Firm* — Thomas, Kayden, Horstemeyer & Risley, LLP

(57) ABSTRACT

Certain aspects of a method and system for transparent TCP offload with a user space library are disclosed. Aspects of a method may include collecting TCP segments in a network interface card (NIC) without transferring state information to a host system. When an event occurs that terminates the collection of TCP segments, a single aggregated TCP segment based on the collected TCP segments may be generated. The aggregated TCP segment may be posted directly to a user space library, bypassing kernel processing of the aggregated TCP segment.

21 Claims, 16 Drawing Sheets

METHOD AND SYSTEM FOR TRANSPARENT TCP OFFLOAD (TTO) WITH A USER SPACE LIBRARY

CROSS-REFERENCE TO RELATED APPLICATIONS/INCORPORATION BY REFERENCE

This patent application is a continuation of application Ser. No. 12/566,064 filed Sep. 24, 2009, which is a continuation of application Ser. No. 11/489,300 filed Jul. 18, 2006, now U.S. Pat. No. 7,596,628 issued Sep. 9, 2009; which application makes reference to, claims priority to and claims benefit from U.S. Provisional Patent Application Ser. No. 60/796,377 filed May 1, 2006.

This application also makes reference to:
U.S. application Ser. No. 11/489,388 filed on Jul. 18, 2006, issued as U.S. Pat. No. 7,684,344 on Mar. 23, 2010;
U.S. application Ser. No. 11/489,078 filed on Jul. 18, 2006;
U.S. application Ser. No. 11/489,393 filed on Jul. 18, 2006;
U.S. application Ser. No. 11/489,390 filed on Jul. 18, 2006;
U.S. application Ser. No. 11/489,389 filed on Jul. 18, 2006, issued as U.S. Pat. No. 7,693,138 on Apr. 6, 2010; and
U.S. application Ser. No. 11/489,407 filed on Jul. 18, 2006.

Each of the above referenced applications is hereby incorporated herein by reference in their entirety.

FIELD OF THE INVENTION

Certain embodiments of the invention relate to processing of TCP data and related TCP information. More specifically, certain embodiments of the invention relate to a method and system for transparent TCP offload (TTO) with a user space library.

BACKGROUND OF THE INVENTION

There are different approaches for reducing the processing power of TCP/IP stack processing. In a TCP Offload Engine (TOE), the offloading engine performs all or most of the TCP processing, presenting to the upper layer a stream of data. There may be various disadvantages to this approach. The TOE may be tightly coupled with the operating system and therefore may require solutions that are dependent on the operating system and may require changes in the operating system to support it. The TOE may require a side by side stack solution, requiring some kind of manual configuration, either by the application, for example, by explicitly specifying a socket address family for accelerated connections. The TOE may also require some kind of manual configuration by an IT administrator, for example, by explicitly specifying an IP subnet address for accelerated connections to select which of the TCP flows will be offloaded and the offload engine is very complex as it needs to implement TCP packet processing.

Large segment offload (LSO)/transmit segment offload (TSO) may be utilized to reduce the required host processing power by reducing the transmit packet processing. In this approach the host sends to the NIC, bigger transmit units than the maximum transmission unit (MTU) and the NIC cuts them to segments according to the MTU. Since part of the host processing is linear to the number of transmitted units, this reduces the required host processing power. While being efficient in reducing the transmit packet processing, LSO does not help with receive packet processing. In addition, for each single large transmit unit sent by the host, the host receives from the far end multiple ACKs, one for each MTU-sized segment. The multiple ACKs require consumption of scarce and expensive bandwidth, thereby reducing throughput and efficiency.

In large receive offload (LRO), a stateless receive offload mechanism, the TCP flows may be split to multiple hardware queues, according to a hash function that guarantees that a specific TCP flow would always be directed into the same hardware queue. For each hardware queue, the mechanism takes advantage of interrupt coalescing to scan the queue and aggregate subsequent packets on the queue belonging to the same TCP flow into a single large receive unit.

While this mechanism does not require any additional hardware from the NIC besides multiple hardware queues, it may have various performance limitations. For example, if the number of flows were larger than the number of hardware queues, multiple flows would fall into the same queue, resulting in no LRO aggregation for that queue. If the number of flows is larger than twice the number of hardware queues, no LRO aggregation is performed on any of the flows. The aggregation may be limited to the amount of packets available to the host in one interrupt period. If the interrupt period is short, and the number of flows is not small, the number of packets that are available to the host CPU for aggregation on each flow may be small, resulting in limited or no LRO aggregation. The limited or no LRO aggregation may be present even in instances where the number of hardware queues is large. The LRO aggregation may be performed on the host CPU, resulting in additional processing. The driver may deliver to the TCP stack a linked list of buffers comprising a header buffer followed by a series of data buffers, which may require more processing than in the case where all the data is contiguously delivered on one buffer.

When the host processor has to perform a read/write operation, a data buffer has to be allocated in the user space. A read operation may be utilized to copy data from the file into this allocated buffer. A write operation may be utilized to transmit the contents of the buffer to a network. The OS kernel has to copy all data from the user space into the kernel space. Copy operations are CPU and memory bandwidth intensive, limiting system performance.

The host processing power may be consumed by the copying of data between user space and kernel space in the TCP/IP stack. Some solutions have been proposed to reduce the host processing power. For example, utilizing remote direct memory access (RDMA) avoids memory copy in both transmit and receive directions. However, this requires a new application programming interface (API), a new wire protocol, and modifications to existing applications at both sides of the wire. A local DMA engine may be utilized to offload memory copy in both transmit and receive directions. Although a local DMA engine may offload copying operations from the CPU, it does not relieve the memory bandwidth required. The memory bandwidth may be a severe bottleneck in high speed networking applications as platforms shift towards multiple CPU architectures, with multiple cores in each CPU, all sharing the same memory.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for transparent TCP offload (TTO) with a user space library, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for transparent TCP offload (TTO) with a user space library. Aspects of the method and system may comprise collecting TCP segments in a network interface card (NIC) without transferring state information to a host system. When an event occurs that terminates the collection of TCP segments, the coalescer may generate a single aggregated TCP segment based on the collected TCP segments. The aggregated TCP segment may be posted directly to a user space library, bypassing kernel processing of the aggregated TCP segment.

Figure 1A:
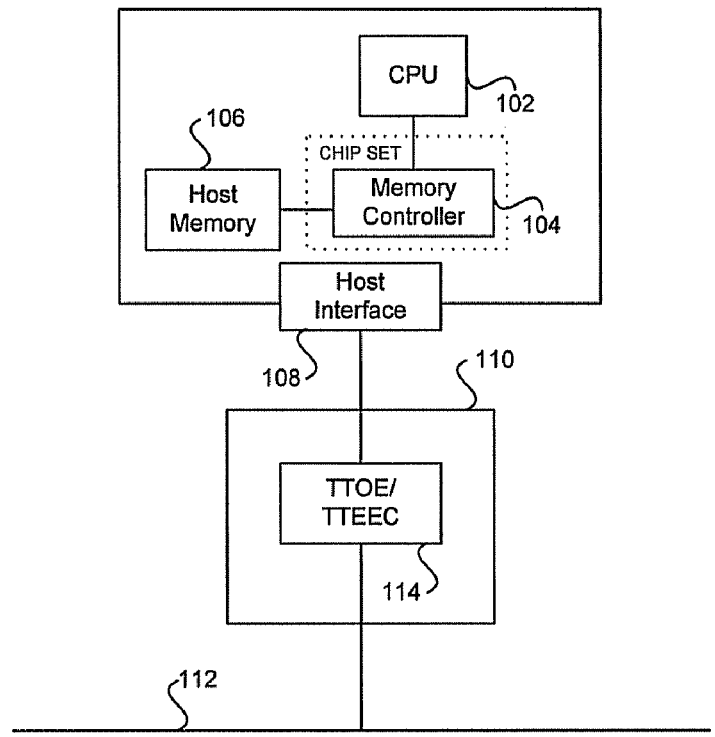
FIG. 1A is a block diagram of an exemplary system for transparent TCP offload, in accordance with an embodiment of the invention.

FIG. 1A is a block diagram of an exemplary system for transparent TCP offload, in accordance with an embodiment of the invention. Accordingly, the system of FIG. 1A may be adapted to handle transparent TCP offload of transmission control protocol (TCP) datagrams or packets. Referring to FIG. 1A, the system may comprise, for example, a CPU 102, a memory controller 104, a host memory 106, a host interface 108, network subsystem 110 and an Ethernet 112. The network subsystem 110 may comprise, for example, a transparent TCP-enabled Ethernet Controller (TTEEC) or a transparent TCP offload engine (TTOE) 114. The network subsystem 110 may comprise, for example, a network interface card (NIC). The host interface 108 may be, for example, a peripheral component interconnect (PCI), PCI-X, PCI-Express, ISA, SCSI or other type of bus. The memory controller 106 may be coupled to the CPU 104, to the memory 106 and to the host interface 108. The host interface 108 may be coupled to the network subsystem 110 via the TTEEC/TTOE 114.

Figure 1B:
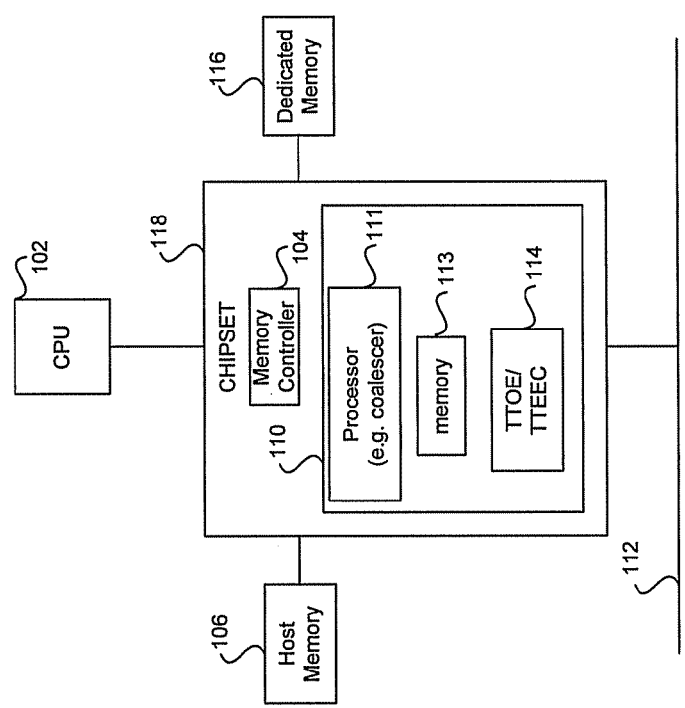
FIG. 1B is a block diagram of another exemplary system for transparent TCP offload, in accordance with an embodiment of the invention.

FIG. 1B is a block diagram of another exemplary system for transparent TCP offload, in accordance with an embodiment of the invention. Referring to FIG. 1B, the system may comprise, for example, a CPU 102, a host memory 106, a dedicated memory 116 and a chip set 118. The chip set 118 may comprise, for example, the network subsystem 110 and the memory controller 104. The chip set 118 may be coupled to the CPU 102, to the host memory 106, to the dedicated memory 116 and to the Ethernet 112. The network subsystem 110 of the chip set 118 may be coupled to the Ethernet 112. The network subsystem 110 may comprise, for example, the TTEEC/TTOE 114 that may be coupled to the Ethernet 112. The network subsystem 110 may communicate to the Ethernet 112 via a wired and/or a wireless connection, for example. The wireless connection may be a wireless local area network (WLAN) connection as supported by the IEEE 802.11 standards, for example. The network subsystem 110 may also comprise, for example, an on-chip memory 113. The dedicated memory 116 may provide buffers for context and/or data.

The network subsystem 110 may comprise a processor such as a coalescer 111. The coalescer 111 may comprise suitable logic, circuitry and/or code that may be enabled to handle the accumulation or coalescing of TCP data. In this regard, the coalescer 111 may utilize a flow lookup table (FLT) to maintain information regarding current network flows for which TCP segments are being collected for aggregation. The FLT may be stored in, for example, the network subsystem 110. The FLT may comprise at least one of the following: a source IP address, a destination IP address, a source TCP address, a destination TCP address, for example. In an alternative embodiment of the invention, at least two different tables may be utilized, for example, a table comprising a 4-tuple lookup to classify incoming packets according to their flow. The 4-tuple lookup table may comprise at least one of the following: a source IP address, a destination IP address, a source TCP address, a destination TCP address, for example. A flow context table may comprise state variables utilized for aggregation such as TCP sequence numbers.

The FLT may also comprise at least one of a host buffer or memory address including a scatter-gather-list (SGL) for non-continuous memory, a cumulative acknowledgments (ACKs), a copy of a TCP header and options, a copy of an IP header and options, a copy of an Ethernet header, and/or accumulated TCP flags, for example. The coalescer 111 may be enabled to generate a single aggregated TCP segment from the accumulated or collected TCP segments when a termination event occurs. The single aggregated TCP segment may be communicated to the host memory 106, for example.

Although illustrated, for example, as a CPU and an Ethernet, the present invention need not be so limited to such examples and may employ, for example, any type of processor and any type of data link layer or physical media, respectively. Accordingly, although illustrated as coupled to the Ethernet 112, the TTEEC or the TTOE 114 of FIG. 1A may be adapted for any type of data link layer or physical media. Furthermore, the present invention also contemplates different degrees of integration and separation between the components illustrated in FIGS. 1A-B. For example, the TTEEC/TTOE 114 may be a separate integrated chip from the chip set 118 embedded on a motherboard or may be embedded in a NIC. Similarly, the coalescer 111 may be a separate integrated chip from the chip set 118 embedded on a motherboard or may be embedded in a NIC. In addition, the dedicated memory 116 may be integrated with the chip set 118 or may be integrated with the network subsystem 110 of FIG. 1B.

Figure 1C:
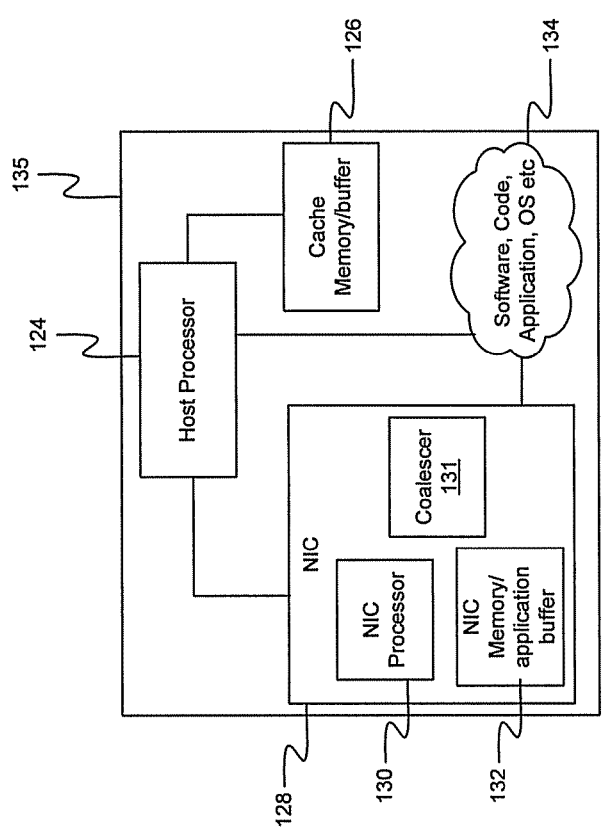
FIG. 1C is an alternative embodiment of an exemplary system for transparent TCP offload, in accordance with an embodiment of the invention.

FIG. 1C is an alternative embodiment of an exemplary system for transparent TCP offload, in accordance with an embodiment of the invention. Referring to FIG. 1C, there is shown a hardware block 135. The hardware block 135 may comprise a host processor 124, a cache memory/buffer 126, a software algorithm block 134 and a NIC block 128. The NIC block 128 may comprise a NIC processor 130, a processor such as a coalescer 131, a completion queue (CQ) 137 and a NIC memory/application buffer block 132. The NIC block 128 may communicate with an external network via a wired and/or a wireless connection, for example. The wireless connection may be a wireless local area network (WLAN) connection as supported by the IEEE 802.11 standards, for example.

The coalescer 131 may be a dedicated processor or hardware state machine that may reside in the packet-receiving path. The host TCP stack may comprise software that enables management of the TCP protocol processing and may be part of an operating system, such as Microsoft Windows or Linux. The coalescer 131 may comprise suitable logic, circuitry and/or code that may enable accumulation or coalescing of TCP data. In this regard, the coalescer 131 may utilize a flow lookup table (FLT) to maintain information regarding current network flows for which TCP segments are being collected for aggregation. The FLT may be stored in, for example, the NIC memory/application buffer block 132. The coalescer 131 may enable generation of a single aggregated TCP segment from the accumulated or collected TCP segments when a termination event occurs. The single aggregated TCP segment may be communicated to the cache memory/buffer 126, for example.

In accordance with certain embodiments of the invention, providing a single aggregated TCP segment to the host for TCP processing significantly reduces overhead processing by the host 124. Furthermore, since there is no transfer of TCP state information, dedicated hardware such as a NIC 128 may assist with the processing of received TCP segments by coalescing or aggregating multiple received TCP segments so as to reduce per-packet processing overhead.

In conventional TCP processing systems, it is necessary to know certain information about a TCP connection prior to arrival of a first segment for that TCP connection. In accordance with various embodiments of the invention, it is not necessary to know about the TCP connection prior to arrival of the first TCP segment since the TCP state or context information is still solely managed by the host TCP stack and there is no transfer of state information between the hardware stack and the software stack at any given time.

In an embodiment of the invention, an offload mechanism may be provided that is stateless from the host stack perspective, while state-full from the offload device perspective, achieving comparable performance gain when compared to TTOE. Transparent TCP offload (TTO) reduces the host processing power required for TCP by allowing the host system to process both receive and transmit data units that are bigger than a MTU. In an exemplary embodiment of the invention, 64 KB of processing data units (PDUs) may be processed rather than 1.5 KB PDUs in order to produce a significant reduction in the packet rate, thus reducing the host processing power for packet processing.

During TTO, no handshake may be utilized between the host operating system and the NIC containing the TTO engine. The TTO engine may operate autonomously in identifying new flows and for offloading. The offload on the transmit side may be similar to LSO, where the host sends big transmission units and the TTO engine may divide them to smaller transmitted packets according to maximum segment size (MSS).

Transparent TCP offload on the receive side may be performed by aggregating a plurality of received packets of the same flow and delivering them to the host as if they were received in one packet—one bigger packet in the case of received data packets, and one aggregate ACK packet in the case of received ACK packets. The processing in the host may be similar to the processing of a big packet that was received. In the case of TCP flow aggregation, rules may be defined to determine whether to aggregate packets. The aggregation rules may be established to allow as much aggregation as possible, without increasing the round trip time such that the decision on whether to aggregate depends on the data that is received and the importance of delivering it to the host without delay. The aggregation may be implemented with transmit-receive coupling, wherein the transmitter and receiver are coupled, by utilizing transmission information for offload decisions, and the flow may be treated as a bidirectional flow. The context information of the receive offload in TTO may be maintained per flow. In this regard, for every received packet, the incoming packet header may be utilized to detect the flow it belongs to and this packet updates the context of the flow.

When the transmitter and receiver are coupled, the transmitted network packets may be searched along with the received network packets to determine the particular network flow to which the packet belongs. The transmitted network packet may enable updating of the context of the flow, which may be utilized for receive offload.

Figure 1D:
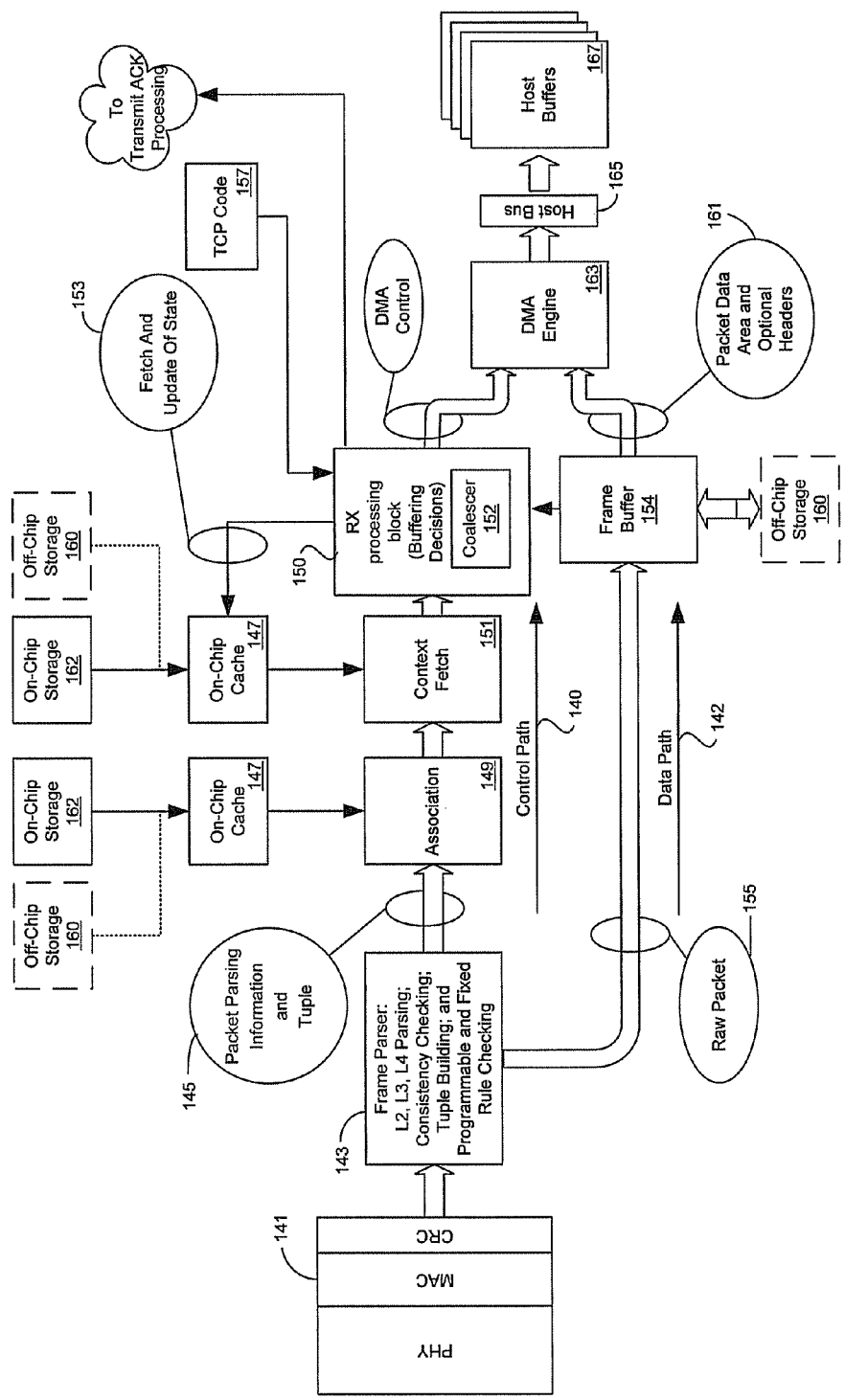
FIG. 1D is a block diagram of an exemplary system for handling transparent TCP offload, in accordance with an embodiment of the invention.

FIG. 1D is a block diagram of a system for handling transparent TCP offload, in accordance with an embodiment of the invention. Referring to FIG. 1D, there is shown an incoming packet frame 141, a frame parser 143, an association block 149, a context fetch block 151, a plurality of on-chip cache blocks 147, a plurality of off-chip storage blocks 160, a plurality of on-chip storage blocks 162, a RX processing block 150, a frame buffer 154, a DMA engine 163, a TCP code block 157, a host bus 165, and a plurality of host buffers 167. The RX processing block 150 may comprise a coalescer 152.

The frame parser 143 may comprise suitable logic, circuitry and/or code that may enable L2 Ethernet processing including, for example, address filtering, frame validity and error detection of the incoming frames 141. Unlike an ordinary Ethernet controller, the next stage of processing may comprise, for example, L3 such as IP processing and L4 such as TCP processing within the frame parser 143. The TTEEC 114 may reduce the host CPU 102 utilization and memory bandwidth, for example, by processing traffic on coalesced TCP/IP flows. The TTEEC 114 may detect, for example, the protocol to which incoming packets belong based on the packet parsing information and tuple 145. If the protocol is TCP, then the TTEEC 114 may detect whether the packet corresponds to an offloaded TCP flow, for example, a flow for which at least some TCP state information may be kept by the TTEEC 114. If the packet corresponds to an offloaded connection, then the TTEEC 114 may direct data movement of the data payload portion of the frame. The destination of the payload data may be determined from the flow state information in combination with direction information within the frame. The destination may be a host memory 106, for example. Finally, the TTEEC 114 may update its internal TCP and higher levels of flow state, without any coordination with the state of the connection on the host TCP stack, and may obtain the host buffer address and length from its internal flow state.

The receive system architecture may comprise, for example, a control path processing 140 and data movement engine 142. The system components above the control path as illustrated in upper portion of FIG. 1D, may be designed to deal with the various processing stages used to complete, for example, the L3/L4 or higher processing with maximal flexibility and efficiency and targeting wire speed. The result of the stages of processing may comprise, for example, one or more packet identification cards that may provide a control structure that may carry information associated with the frame payload data. This may have been generated inside the TTEEC 114 while processing the packet in the various blocks. A data path 142 may move the payload data portions or raw packets 155 of a frame along from, for example, an on-chip packet frame buffer 154 and upon control processing completion, to a direct memory access (DMA) engine 163 and subsequently to the host buffer 167 via the host bus 165 that was chosen via processing. The data path 142 to the DMA engine may comprise packet data are and optional headers 161.

The receiving system may perform, for example, one or more of the following: parsing the TCP/IP headers 145; associating the frame with a TCP/IP flow in the association block 149; fetching the TCP flow context in the context fetch block 151; processing the TCP/IP headers in the RX processing block 150; determining header/data boundaries and updating state 153; mapping the data to a host buffers; and transferring the data via a DMA engine 163 into these host buffers 167. The headers may be consumed on chip or transferred to the host buffers 167 via the DMA engine 163.

The packet frame buffer 154 may be an optional block in the receive system architecture. It may be utilized for the same purpose as, for example, a first-in-first-out (FIFO) data structure is used in a conventional L2 NIC or for storing higher layer traffic for additional processing. The packet frame buffer 154 in the receive system may not be limited to a single instance. As control path 140 processing is performed, the data path 142 may store the data between data processing stages one or more times.

In an exemplary embodiment of the invention, at least a portion of the coalescing operations described for the coalescer 111 in FIG. 1B and/or for the coalescer 131 in FIG. 1C may be implemented in a coalescer 152 in the RX processing block 150 in FIG. 1D. In this instance, buffering or storage of TCP data may be performed by, for example, the frame buffer 154. Moreover, the FLT utilized by the coalescer 152 may be implemented using the off-chip storage 160 and/or the on-chip storage 162, for example.

The user space library may request allocation of a FLT entry for each flow that it handles. These requests may be proxied through a privileged agent or the kernel, because the offload device may not have knowledge that the user space library has the authority to handle any specific flow. Approved requests from the user space library may result in a new entry in the FLT indicating the offload type for that flow and a flow ID.

In another embodiment of the invention, a plurality of segments of the same flow may be aggregated in TTO up to a receive aggregation length (RAL), presenting to the host a bigger segment for processing. If aggregation is allowed, the received packet may be placed in the cache memory 126 but will not be delivered to the host. Instead, the host processor 124 may update the context of the flow this packet belongs to. The new incoming packet may either cause the packet to be delivered immediately alone if there were no prior aggregated packets that were not delivered or as a single packet that represents both that packet and the previously received packets. In another embodiment of the invention, the packet may not be delivered but may update the flow's context.

A termination event may occur and the packet may not be aggregated if at least one of the following occurs at the TCP level: (1) the data is not in-order as derived from the received sequence number (SN) and the flow's context; (2) at least one packet with TCP flags other than ACK flag, for example, a PUSH flag is detected; (3) at least one packet with selective acknowledgement (SACK) information is detected; or (4) if the ACK SN received is bigger than the delivered ACK SN, and requires stopping the aggregation. Similarly, a termination event may occur and the packet may not be aggregated if at the IP level, the type of service (TOS) field in the IP header is different than the TOS field of the previous packets that were aggregated.

When aggregating a plurality of packets to a single packet, the aggregated packet's header may contain the aggregated header of all the individual packets it contains. In an exemplary embodiment of the invention, a plurality of TCP rules for the aggregation may be as follows. For example, (1) the SN in the aggregated header is the SN of the first or oldest packet; (2) the ACK SN is the SN of the last or youngest segment; (3) the length of the aggregated header is the sum of the lengths of all the aggregated packets; (4) the window in the aggregated header is the window received in the last or youngest aggregated packet; (5) the time stamp (TS) in the aggregated header is the TS received in the first or oldest aggregated packet; (6) the TS-echo in the aggregated header is the TS-echo received in the first or oldest aggregated packet; and (7) the checksum in the aggregated header is the accumulated checksum of all aggregated packets.

In an exemplary embodiment of the invention, a plurality of IP field aggregation rules may be provided. For example, (1) the TOS of the aggregated header may be that of all the aggregated packets; (2) the time-to-live (TTL) of the aggregated header is the minimum of all incoming TTLs; (3) the length of the aggregated header is the sum of the lengths in the aggregated packets; (4) the fragment offset of the aggregated header may be zero for aggregated packets; and (5) the packet ID of the aggregated header is the last ID received.

The received packets may be aggregated until the received packet cannot be aggregated due to the occurrence of a termination event, or if a timeout has expired on that flow, or if the aggregated packet exceeds RAL. The timeout may be implemented by setting a timeout to a value, timeout aggregation value, when the first packet on a flow is placed without delivery. The following packets that are aggregated may not change the timeout. When the packets are delivered due to timeout expiration the timeout may be canceled and may be set again in the next first packet that is not delivered. Notwithstanding, other embodiments of the invention may provide timeout implementation by periodically scanning all the flows.

In an exemplary embodiment of the invention, the received ACK SN may be relevant to determine the rules to aggregate pure ACKs and to determine the rules to stop aggregation of packets with data due to the received ACK SN. The duplicated pure ACKs may never be aggregated. When duplicated pure ACKs are received, they may cause prior aggregated packets to be delivered and the pure ACK may be delivered immediately separately. The received ACK SN may also be utilized to stop the aggregation and deliver the pending aggregated packet to the host TCP/IP stack.

In an exemplary embodiment of the invention, a plurality of rules may be provided for stopping the aggregation according to the ACK SN. For example, (1) if the number of acknowledged (ACKed) bytes that are not yet delivered, taking into account the received segments and the prior segments that were not delivered exceeds a threshold, ReceiveAckedBytesAggretation, for example, in bytes; or (2) the time from the arrival of the first packet that advanced the received ACK SN exceeds a threshold, TimeoutAckAggregation, for example. For this purpose, a second timer per flow may be required or other mechanisms, such as periodically scanning the flows may be implemented.

In another exemplary embodiment of the invention, the flows may be removed from the host memory if one of the following occurs: (1) a reset (RST) flag was detected in the receive side; (2) a finish (FIN) flag was detected in the receive side; (3) there was no receive activity on the flow for a predefined time TerminateNoActivityTime, for example; (4) a KeepAlive packet in the receive direction was not acknowledged. A least recently used (LRU) cache may be used instead of a timeout rule to remove the flows from the host memory.

Figure 1E:
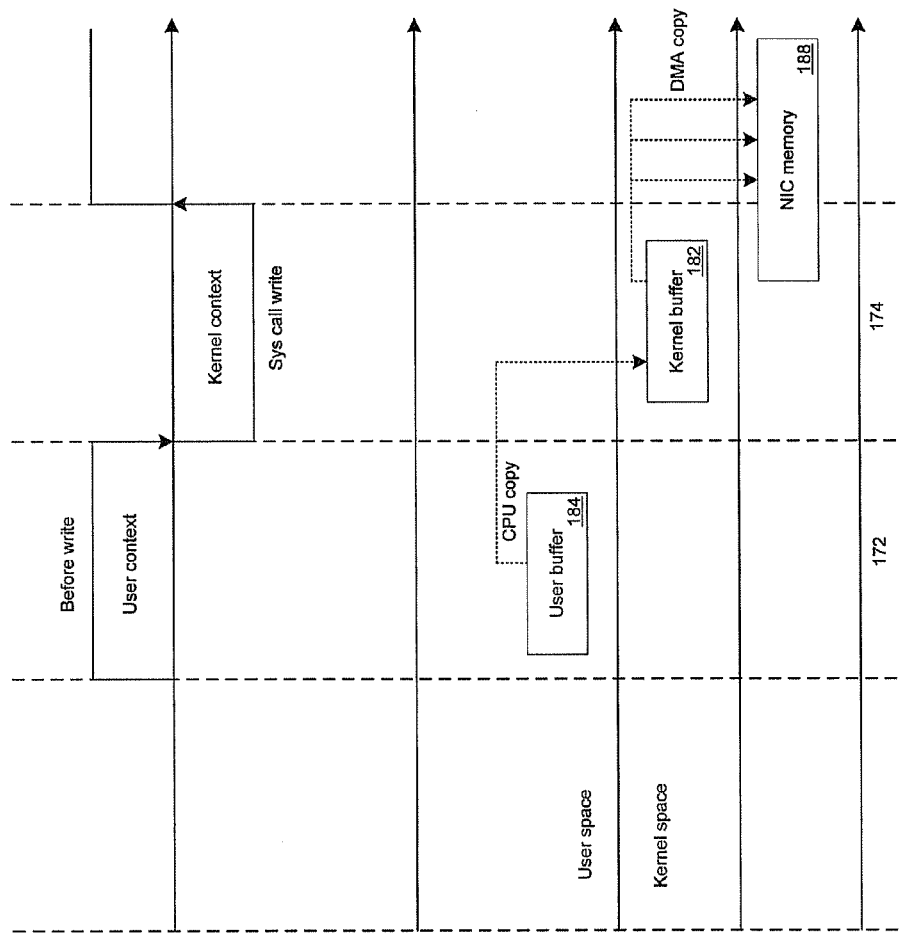
FIG. 1E is a flow diagram illustrating copying of data for a write operation in a host CPU system, in accordance with an embodiment of the invention.

FIG. 1E is a flow diagram illustrating copying of data for a write operation in a host CPU system, in accordance with an embodiment of the invention. Referring to FIG. 1E, there is shown various context switches, a user buffer 184, a kernel buffer 182, a NIC memory 188, and copy operations to be performed for a write operation. In step 172, the write system call may cause a context switch from user mode to kernel mode. A copy may be performed to transfer the data into a kernel buffer 182. In step 174, the write system call may return, creating another context switch. Another copy may occur as the DMA engine may pass the data from the kernel buffer 182 to the NIC memory 188 independently and asynchronously. The data duplication may not be necessary and may be eliminated to decrease overhead and increase performance. To eliminate overhead, some of the copying between the kernel buffer 182 and user buffers 184 may be eliminated.

Figure 1F:
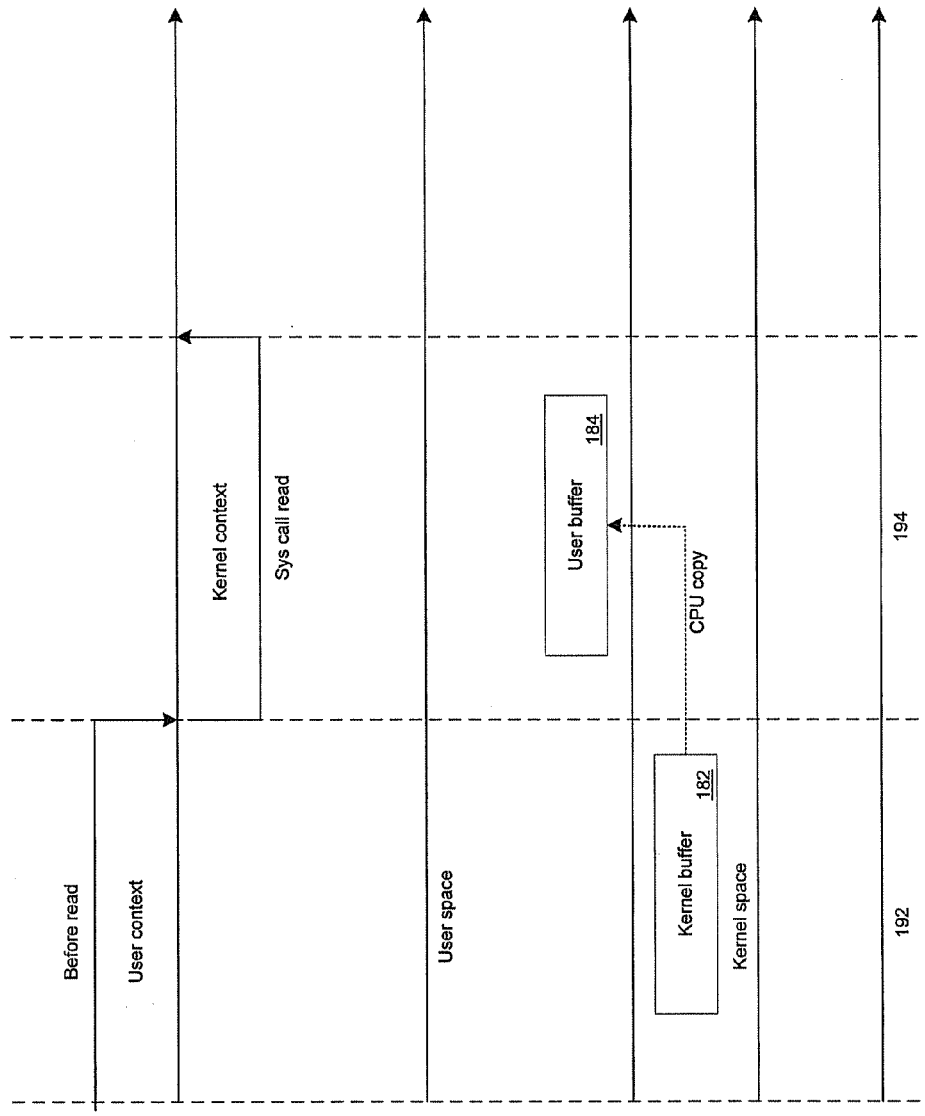
FIG. 1F is a flow diagram illustrating copying of data for a read operation in a host CPU system, in accordance with an embodiment of the invention.

FIG. 1F is a flow diagram illustrating copying of data for a read operation in a host CPU system, in accordance with an embodiment of the invention. Referring to FIG. 1F, there is shown various context switches, a user buffer 184, a kernel buffer 182, a NIC memory 188, and copy operations to be performed for a write operation. In step 192, the read system call may cause a context switch from user mode to kernel mode. A copy may be performed to transfer the data into a kernel buffer 182. In step 194, the read system call may return, creating another context switch. Another copy may occur as the DMA engine may pass the data from the kernel buffer 182 to the NIC memory 188 independently and asynchronously. The data duplication may not be necessary and may be eliminated to decrease overhead and increase performance. To eliminate overhead, some of the copying between the kernel buffer 182 and user buffer 184 may be eliminated.

Figure 2A:
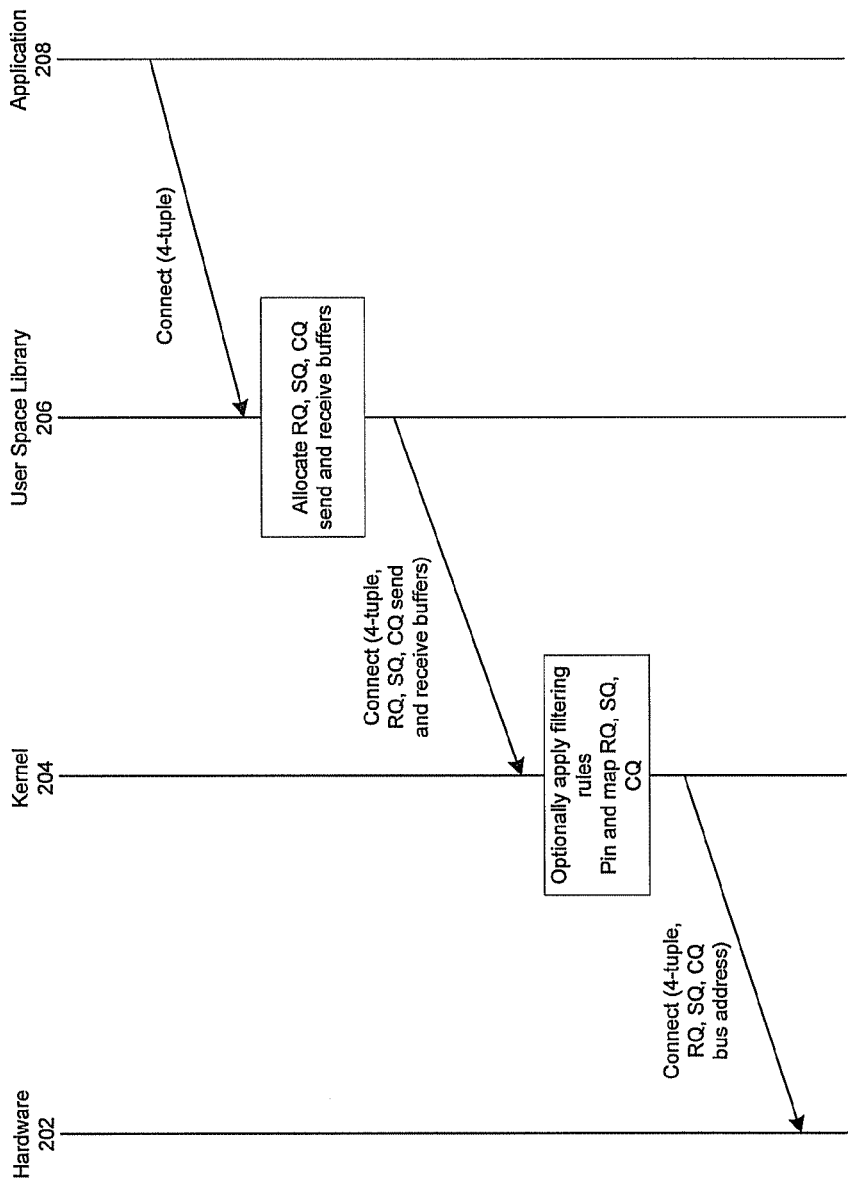
FIG. 2A is a flow diagram that illustrates exemplary connection establishment for transparent TCP offload (TTO) with a user space library, in accordance with an embodiment of the invention.

FIG. 2A is a flow diagram that illustrates exemplary connection establishment for TTO with a user space library, in accordance with an embodiment of the invention. Referring to FIG. 2A, there is shown hardware 202, a kernel 204, a user space library 206 and an application 208. The hardware 202 may comprise suitable logic and/or circuitry that may be enabled to process received data from various drivers, and other devices coupled to the hardware 202. The kernel 204 may comprise suitable logic and/or code that may be enabled to manage the CPU's 102 resources and enable other applications 208 to run on the host system. The kernel 204 may enable scheduling, buffering, caching, spooling, and error handling functions, for example. The kernel 204 may also enable communication between various hardware and software components. The user space library 206 may be a collection of subprograms utilized to develop software. The user space library 206 may allow code and data to be shared and changed in a modular fashion.

The user space library 206 may register a connection by identifying the 4-tuple, a receive queue (RQ), a send queue (SQ), and a completion queue (CQ). The kernel 204 may optionally apply filtering rules to the registered connection packet to determine whether to allow the connection request. The kernel 204 may pin and map the RQ, SQ, CQ, and user context buffers. The kernel 204 may also store the DMA addresses of the RQ, SQ, CQ, and user context buffers in a newly allocated FLT for the flow.

In another embodiment of the invention, the user space library 206 may specify a handle of an existing connection provided by the kernel 204. The kernel 204 may agree to transfer ownership of the connection to the user space library 206. If the kernel 204 agrees to transfer ownership of the connection to the user space library 206, the kernel 204 may provide the required TCP state information for that connection to the user space library 206.

In another embodiment of the invention, the user space library 206 may handle passive connection establishment on its own. The user space library 206 may request the local IP Address and TCP port to be assigned to it, specifying the particular RQ and CQ to be used. If approved, the kernel 204 may register and pin the RQ and CQ, if not already pinned, and then create the offload listen entry.

Figure 2B:
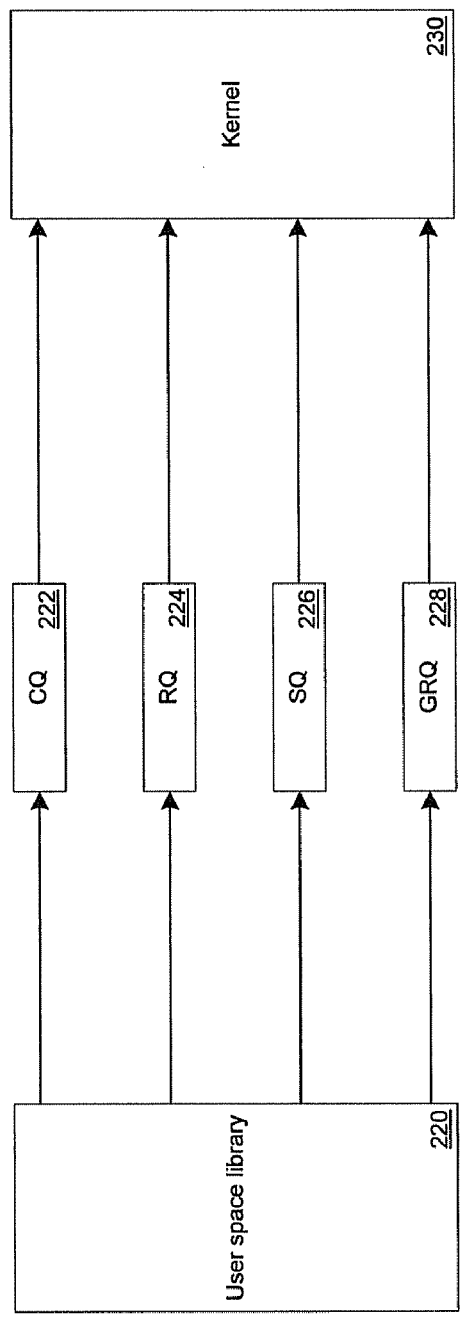
FIG. 2B is a block diagram of an exemplary system illustrating allocation of queues by a user space library, in accordance with an embodiment of the invention.

FIG. 2B is a block diagram of an exemplary system illustrating allocation of queues by a user space library, in accordance with an embodiment of the invention. Referring to FIG. 2B, there is shown a user space library 220, a completion queue (CQ) 222, a receive queue (RQ) 224, a send queue (SQ) 226, a general receive queue (GRQ) 228, and a kernel 230.

The user space library 220 may allocate at least one receive queue (RQ) 224, a send queue (SQ) 226, a general receive queue (GRQ) 228, a completion queue (CQ) 222 before enabling the flow for user space TTO handling. The kernel 230 may pin and map the RQ 224, SQ 226, CQ 222, and GRQ 228. The user space library 220 may allocate the RQ 224, SQ 226, CQ 222 and GRQ 228 data structures independently of any specific flow. The kernel 230 may supply a handle that may be referenced in later requests from the user space library 220.

A send queue (SQ) 226 may allow the user space library 220 to directly post transmit work requests to a buffer ring that may be read directly by the device. An optional doorbell may provide a memory-mapped location that the user space library 220 may write to in order to provide an event notification to the device. This doorbell ring may inform the device that a specific send queue 226 is not empty. The send queue 226 with a doorbell may be utilized for interfacing with RDMA devices. As with a RDMA interface, the buffers referenced in the work requests may use a handle representing an already registered buffer so that the device knows that the work request poster has the necessary permissions to use this buffer. This handle may be referred to as a steering tag (Stag) for RDMA over IP interfaces. The implementation of TTO with a user mode library may differ in the nature of the work requests posted to the send queue 226.

A receive queue (RQ) 224 may allow the user space library 220 to directly post receive work requests to a buffer pool that may be read directly by the device. As with transmit work requests, the buffer references may use a handle representing a registered buffer. A receive queue 224 supporting user mode TTO may differ from a conventional RQ as the buffers may not be pre-associated with a specific incoming message at the time they are posted. This is because the underlying wire protocol, TCP, may not have a mandated correlation between work requests and wire protocol messages.

A completion queue (CQ) 222 may allow the user space library 220 to directly receive work completions written by the device. A completion queue 222 supporting user mode TTO may differ from a conventional CQ as TTO may generate work completions in a more flexible order than would apply for a CQ 222 supporting RDMA. The completion queue 222 may have an associated mechanism where the user process may enable notification callbacks when a work completion is generated, or when a specific type of work completion is generated. For user mode TTO, a proxy mechanism may be selected so that the device may still notify the user mode library. A proxy in the kernel may be required because the device may not directly interrupt a user mode process. For example, a method for implementing this notification relay proxy may be relaying the callback, unblocking a semaphore or thread, or generating an event associated with a file descriptor.

A flow context may be utilized to track per-flow state and information, similar to kernel TTO. However, user mode TTO may split the flow context into a privileged, or kernel context and a user context. The user context may be directly accessible by the user mode library 220, while the privileged or kernel context may be updated by a privileged entity such as the kernel 230.

An offload listen table (OLT) may be utilized to divert TCP Segments that do not match a specific flow, but match a local TCP port. An OLT may be integrated with support for offloaded connections, such as TOE, iSCSI and RDMA.

The user space TCP library 220 may be enabled to offer a socket API and/or socket operation interface. Each operation may correspond to a receive message (recvmsg( )) or send message (sendmsg( )) call depending on whether the API offered is a literal sockets API, a callback API and/or a work queue based asynchronous operation. For example, if a user posts three successive recvmsg( ) operations, then there may be three completions assuming there are no errors and the amount of payload delivered with each completion may match recvmsg( ) semantics. Accordingly, the number of TCP header actions required may not necessarily depend on the number of work request completions the user receives.

There may be two different data structures for receive buffers, for example, the RQ 224 and the GRQ 228. The RQ 224 may be enabled for direct reception if the user space library 220 determines that the overhead of enabling CNIC 128 access to it is justified. The just-in-time pinning may be utilized for justifying registration, else the user space library 220 may be utilized for justification of modestly sized buffers that are re-used frequently and very large buffers.

The GRQ 228 may receive data when an RQ 224 entry is not available and/or for out-of-order packets. The out-of-order packets may be placed in RQ 224 buffers, but they may then have to be moved, if a PSH operation requires delivery of data before the buffer is full. Whenever a GRQ 228 buffer is completed, at least one RQ 224 buffer may also be completed whether or not anything was placed in it. The CQ 222 poll routine (cq_poll), in user space, may copy whatever data was placed in GRQ 228 buffers to the RQ 224 buffer. The RQ 224 buffer may be a suitable destination for a memory copy operation (memcpy( )) even if no registration was ever performed on it, because cq_poll is a user space routine. The cost of the memcpy( ) operation may be negligible since the data may be in-cache for the application to use and is performed immediately before the application processes the data.

In contrast with a kernel handler performing a copy to user, the copy to user operation may be more complex than memcpy( ) and the chances that the cache may be invalidated before the application can use the data is higher. When a recvmsg( ) call is performed, the user space library 220 may be enabled to receive work completions that reported placement into GRQ 228 buffers, and then determine if the user space library 220 needs to wait for subsequent work requests. If waiting for subsequent work requests is warranted, the user space library 220 may decide to post a work request with the registered buffer ID for the target buffer to the RQ 224. Alternatively, the user space library 220 may wait for new GRQ 228 completions. When there are more completions, the user space library 220 may repeat the process, until it has enough received data to complete the socket level operation. Alternately, the user space library 220 may operate on a callback API, where it may invoke the next higher layer with an SGL composed of GRQ 228 buffers and an imperative indicating ownership and/or urgency in processing. The user space library 220 may process a plurality of headers and determine that the recvmsg( ) operation is not complete and continue working on the same RQ 224 work request.

In accordance with an embodiment of the invention, an RDMA-style interface based upon a mapped memory interface may be utilized and the elements of this interface may be referred to as a queue pair (QP) and completion queue (CQ) 222. TTO with a user space library may differ from TTO using kernel code based on a plurality of data structures used to interface the user space library 220 directly with the offload device.

Figure 3A:
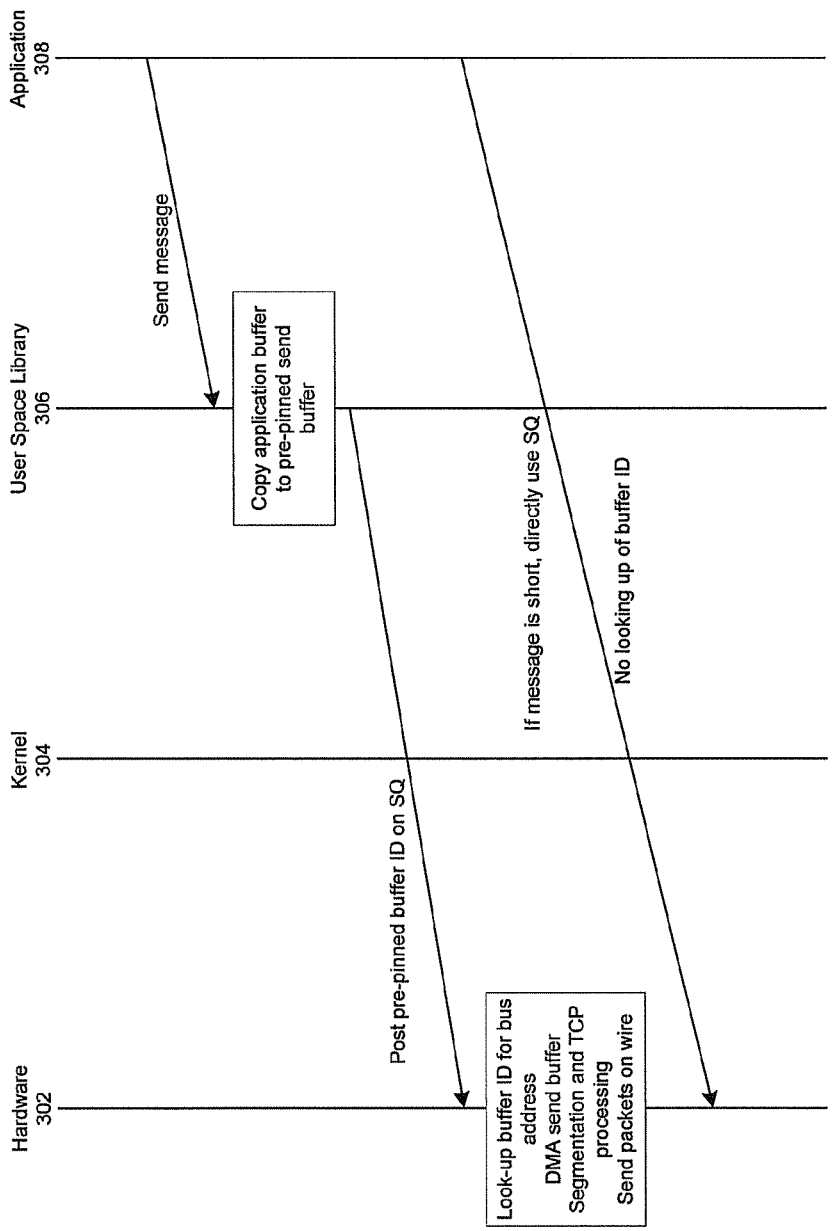
FIG. 3A is a flow diagram that illustrates exemplary sending or transmission for TTO with a user space library, in accordance with an embodiment of the invention.

FIG. 3A is a flow diagram that illustrates exemplary sending or transmission for TTO with a user space library, in accordance with an embodiment of the invention. Referring to FIG. 3A, there is shown hardware 302, a kernel 304, a user space library 306 and an application 308.

The hardware 302 may comprise suitable logic and/or circuitry that may be enabled to process received data from various drivers, and other devices coupled to the hardware 302. The kernel 304 may comprise suitable logic and/or code that may be enabled to manage the CPU's 102 system and/or device resources and enable other applications 308 to run on the host system. The kernel 304 may enable scheduling, buffering, caching, spooling, and error handling functions, for example. The kernel 304 may also enable communication between various hardware and software components. The user space library 306 may comprise a collection of subprograms, which may be utilized to develop software. The user space library 306 may allow code and/or data to be shared and changed in a modular fashion.

The application 308 may be enabled to transmit a send message to the user space library 306. If the send message is short or has a certain size, the user space library 306 may avoid pinning the application send buffer 132. In instances where the send message is short, it may be transmitted directly to the hardware using a SQ without looking up the buffer ID. If the send message is not short or is greater than a certain size, the user space library 306 may be enabled to copy the application send buffer 132 to a pre-pinned application send buffer 132. The user space library 306 may post the pre-pinned application send buffer ID on the send queue (SQ). The hardware 302 may be enabled to look-up the buffer ID for the buffer address. The hardware 302 may be enabled to direct memory access (DMA) the application send buffer 132. The hardware 302 may perform segmentation and TCP processing of the generated TCP segment in the application send buffer 132 and transmit the resulting generated TCP segment packets on the wire.

Figure 3B:
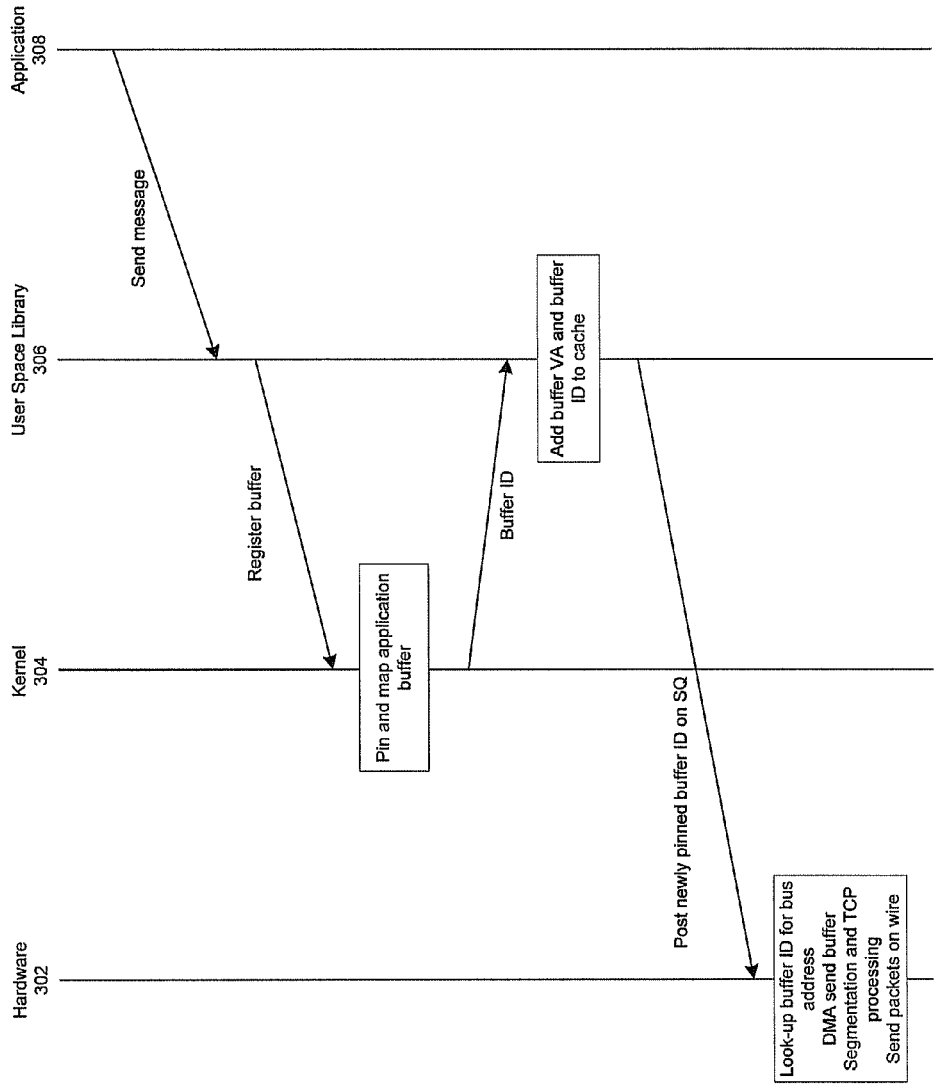
FIG. 3B is a flow diagram that illustrates exemplary sending or transmission for TTO with a user space library when the application buffer is not in cache, in accordance with an embodiment of the invention.

FIG. 3B is a flow diagram that illustrates exemplary sending or transmission for TTO with a user space library when the application buffer is not in cache, in accordance with an embodiment of the invention. Referring to FIG. 3B, there is shown hardware 302, a kernel 304, a user space library 306 and an application 308.

In instances, when the application send buffer 132 is not in cache, the application 308 may be enabled to transmit a send message to the user space library 306. The user space library 306 may register the application send buffer 132 and transmit the application send buffer 132 to the kernel 304. The kernel 304 may be enabled to pin and map the application send buffer 132. The kernel 304 may transmit the buffer ID of the application send buffer 132 to the user space library 306. The user space library 306 may add a buffer virtual address to the received buffer ID and store the buffer ID in cache. The user space library 306 may post the buffer ID of the pinned and mapped application send buffer 132 in SQ to the hardware 302. The hardware 302 may be enabled to look-up the buffer ID for the buffer address. The hardware 302 may be enabled to direct memory access (DMA) transfer data for the application send buffer 132. The hardware 302 may perform segmentation and TCP processing of the generated TCP segment in the application send buffer 132 and transmit the resulting generated TCP segment packets on the wire.

In another embodiment of the invention, the user space library 306 may be enabled to post work requests to the send queue (SQ) directly without assistance from the kernel 304. For example, a method for the user space library 306 to inform the device that the send queue is no longer empty is the use of a doorbell. The doorbell is an address on the bus, which may result in an event notification to the device when the user writes to it. Doorbells may be allocated for several flows so that the address page may be write-enabled for a single user process. When direct posting to the send queue is enabled, the device may validate that the packets specified are legitimate for the send queue. If the source and destination headers were reversed, the resulting packet may be assigned to the same FLT.

The work requests posted to the send queue directly from the user space library 306 may require user registered buffer IDs. These registered buffer IDs may represent the actual buffer, which the user space library 306 has registered, or an intermediate pre-registered buffer, which the user space library 306 copied the outbound data to. The user space library 306 may be enabled to determine the particular technique to be used at its discretion.

If a target application receive buffer is not in the registered cache, the user space library 306 may enable registration of the target application receive buffer. For example, a user space library 306 may utilize a memory registration request to register a receive buffer. The user space library 306 may cache registration of receive buffers so that when an application 308 submits the same buffer on subsequent requests the user space library 306 may not have to repeat the registration process.

Figure 3C:
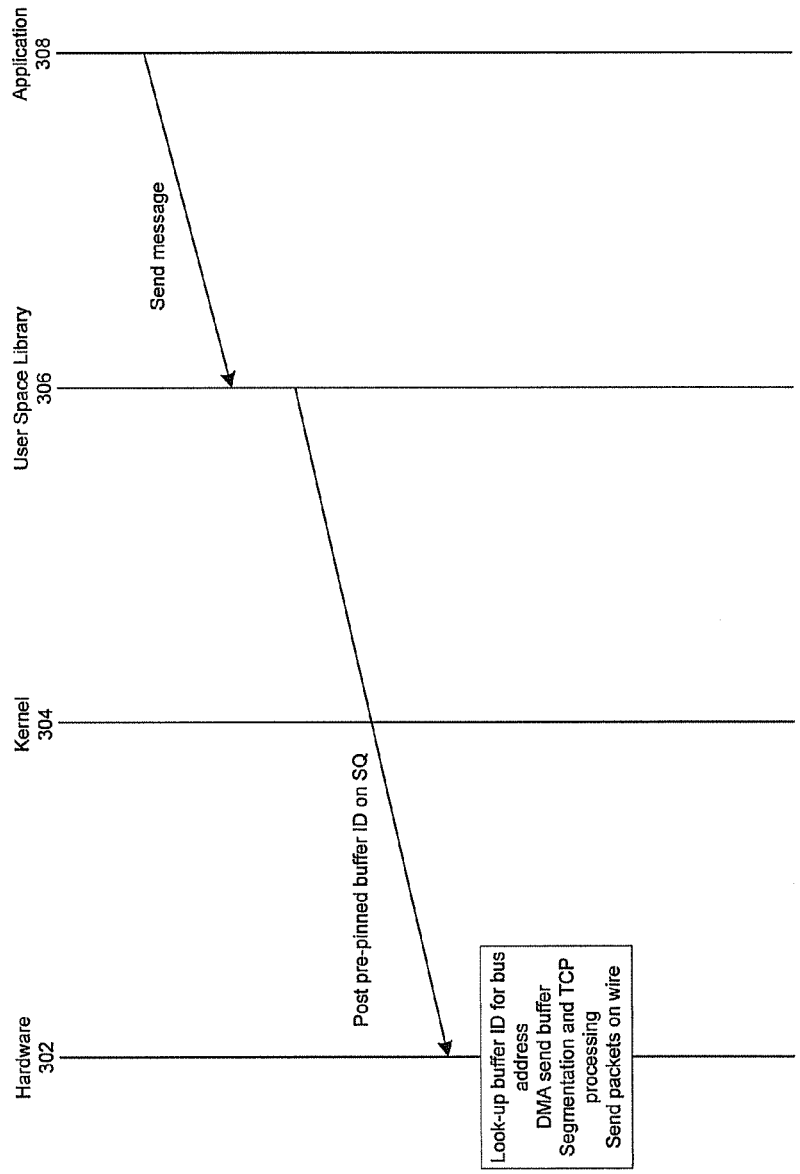
FIG. 3C is a flow diagram that illustrates exemplary sending or transmission for TTO with a user space library when the application buffer is in cache, in accordance with an embodiment of the invention.

FIG. 3C is a flow diagram that illustrates exemplary sending or transmission for TTO with a user space library when the application buffer is in cache, in accordance with an embodiment of the invention. Referring to FIG. 3C, there is shown hardware 302, a kernel 304, a user space library 306 and an application 308.

When the application buffer is in cache, the application 308 may be enabled to transmit a send message to the user space library 306. The user space library 306 may be enabled to post the pre-pinned application send buffer ID of the application send buffer 132 on SQ to the hardware 302 without kernel 304 involvement for short send messages. The hardware 302 may be enabled to look-up the buffer ID for the buffer address. The hardware 302 may be enabled to direct memory access (DMA) the data in the application send buffer 132. The hardware 302 may perform segmentation and TCP processing of the generated TCP segment in the application send buffer 132 and transmit the resulting generated TCP segment packets on the wire. In instances where the generated TCP segment is cached in the memory 126, then the generated TCP segment may be posted directly to the hardware 302 or host processor 124, thereby bypassing kernel 234 processing of the generated TCP segment.

Figure 4A:
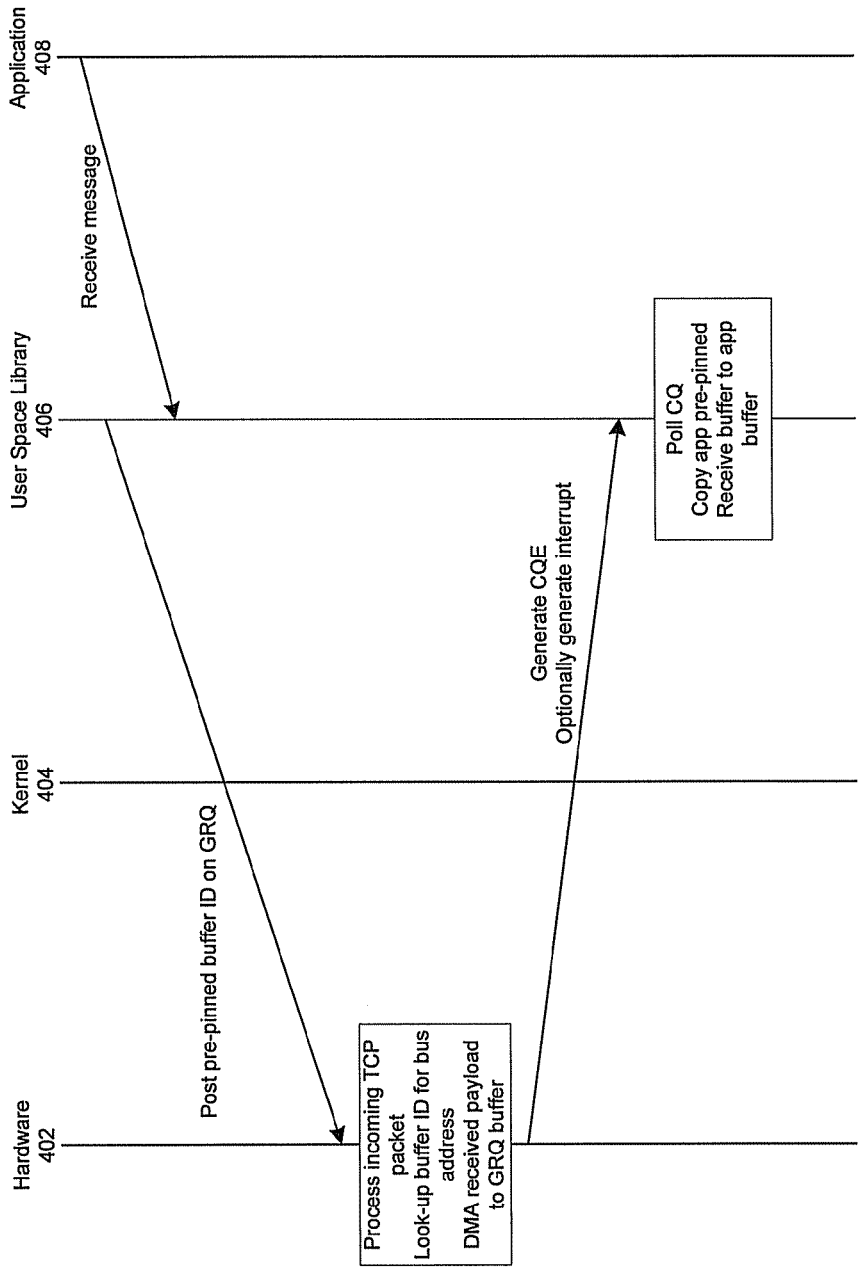
FIG. 4A is a flow diagram that illustrates exemplary receiving for TTO with a user space library, in accordance with an embodiment of the invention.

FIG. 4A is a flow diagram that illustrates exemplary receiving for TTO with a user space library, in accordance with an embodiment of the invention. Referring to FIG. 4A, there is shown hardware 402, a kernel 404, a user space library 406 and an application 408.

The hardware 402 may comprise suitable logic and/or circuitry that may be enabled to process received data from various drivers, and other devices coupled to the hardware 402. The kernel 404 may comprise suitable logic and/or code that may be enabled to manage the CPU's 102 system and/or device resources and enable other applications 308 to run on the host system. The kernel 404 may enable scheduling, buffering, caching, spooling, and error handling functions, for example. The kernel 404 may also enable communication between various hardware and software components. The user space library 406 may comprise a collection of subprograms, which may be utilized to develop software. The user space library 406 may allow code and/or data to be shared and changed in a modular fashion.

The hardware 402 may be enabled to place header and payload to the receive buffers obtained from the RQ or GRQ. The hardware 402 may translate the buffer ID and offset to the required DMA addresses by validating remote write access to the target memory to prevent buffer overruns.

The user space library 406 may be enabled to post a pre-pinned buffer ID of the application receive buffer 132 on a generic receive queue (GRQ) to the hardware 402. The hardware 402 may be enabled to process the generated TCP segment and look-up the buffer ID for the buffer address and place the generated TCP segment on pre-posted library buffers. The hardware 402 may be enabled to direct memory access (DMA) the received payload to a GRQ buffer 228. The hardware 402 may be enabled to generate a completion queue entry (CQE) in the completion queue (CQ) 222 in order to indicate reception of the generated TCP packet. The user space library 406 may be enabled to poll the completion queue (CQ) 222. When the user space library 406 completes polling the CQ 222, the user space library 406 may request the hardware 402 that subsequent completion may be followed by an event notification. The user space library 406 may be enabled to copy the pre-pinned application receive buffer to an application receive buffer 132.

Registered buffers may be posted in receive work requests to the receive queue (RQ) and/or general receive queue (GRQ). The hardware 402 may enable indication of receipt of a TCP segment into a buffer allocated from the RQ or GRQ by posting a work completion or completion queue entry (CQE) to the completion queue (CQ). The hardware 402 may be enabled to generate a notification event when posting to a CQ.

Figure 4B:
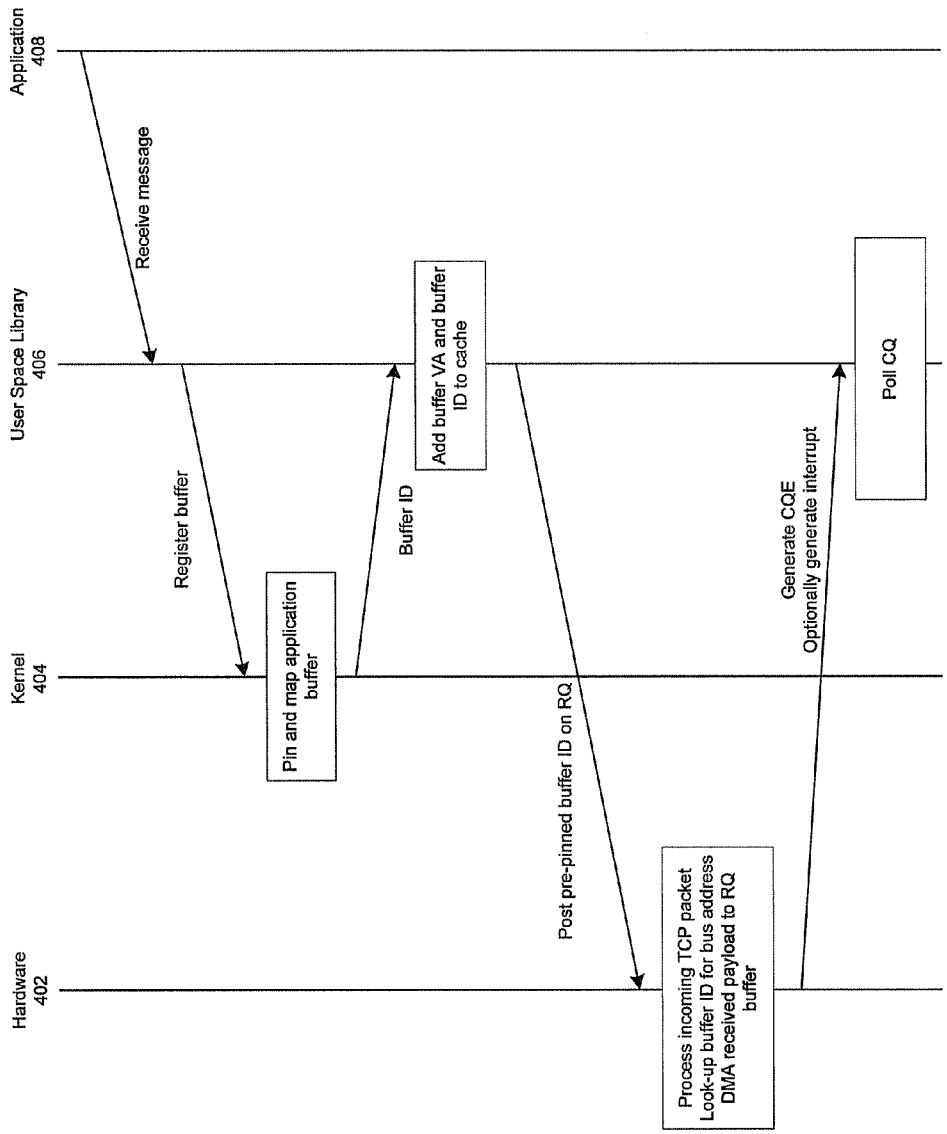
FIG. 4B is a flow diagram that illustrates exemplary receiving for TTO with a user space library when the application buffer is not in cache, in accordance with an embodiment of the invention.

FIG. 4B is a flow diagram that illustrates exemplary receiving for TTO with a user space library when the application buffer is not in cache, in accordance with an embodiment of the invention. Referring to FIG. 4B, there is shown hardware 402, a kernel 404, a user space library 406 and an application 408.

In instances where the application receive buffer 132 is not in cache, the application 408 may be enabled to transmit a receive message to the user space library 406. The user space library 406 may register an application receive buffer 132 and transmit the application receive buffer 132 to the kernel 404. The kernel 404 may be enabled to pin and map the application receive buffer 132. The kernel 404 may transmit the buffer ID of the pinned and mapped application receive buffer 132 to the user space library 406. The user space library 406 may add a buffer virtual address to the received buffer ID and store the buffer ID in cache. The user space library 406 may post the newly pinned buffer ID on RQ to the hardware 402.

The hardware 402 may be enabled to process the generated TCP segment, look-up the buffer ID for the buffer address, and place generated TCP segment directly in the corresponding pinned and mapped application receive buffer 132. The hardware 402 may be enabled to direct memory access (DMA) the payload for the generated TCP segment to a RQ buffer 224. The hardware 402 or host processor 124 may be enabled to generate a completion queue entry (CQE) in the completion queue 222, which indicates reception of the generated TCP segment. The user space library 406 may be enabled to poll the completion queue (CQ) 222. When the user space library 406 completes polling the CQ 222, the user space library 406 may request the hardware 402 that subsequent completion may be followed by an event notification.

Figure 4C:
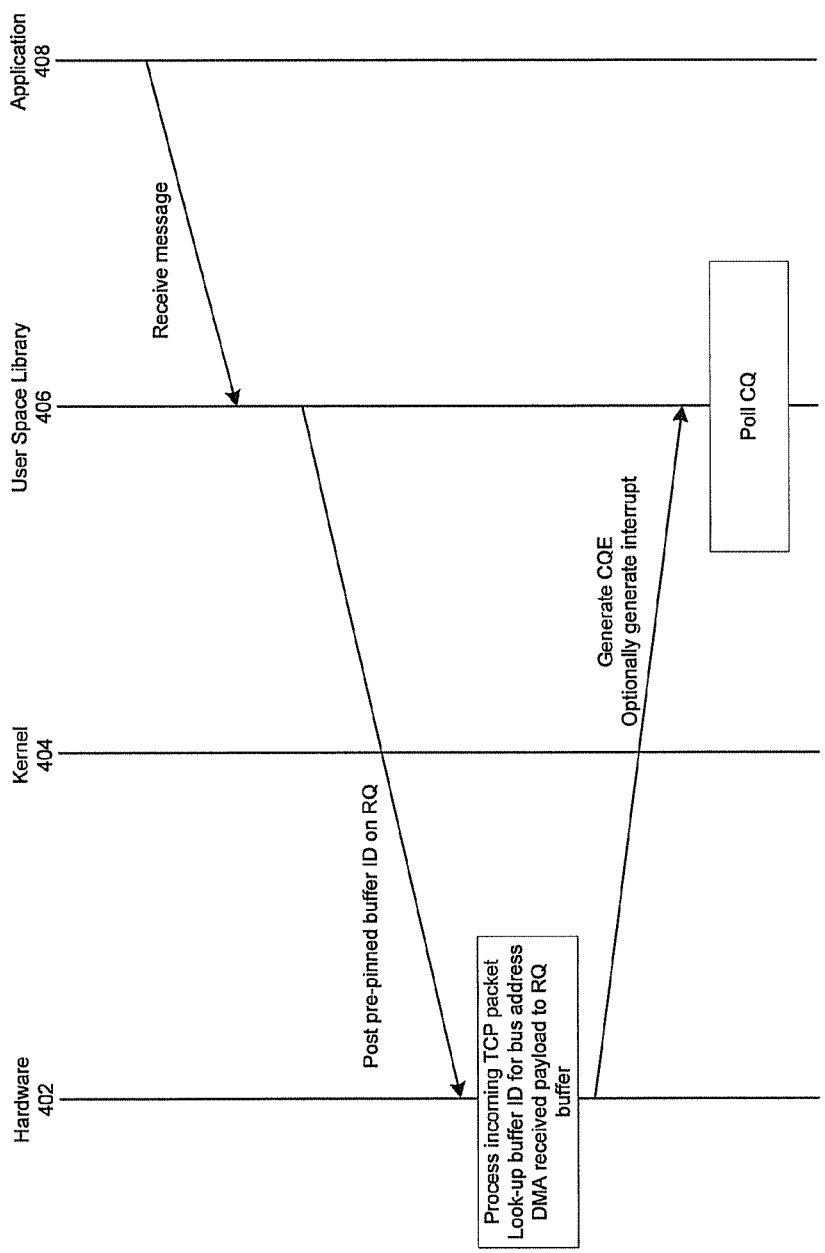
FIG. 4C is a flow diagram that illustrates exemplary receiving for TTO with a user space library when the application buffer is in cache, in accordance with an embodiment of the invention.

FIG. 4C is a flow diagram that illustrates exemplary receiving for TTO with a user space library when the application buffer is in cache, in accordance with an embodiment of the invention. Referring to FIG. 4C, there is shown hardware 402, a kernel 404, a user space library 406 and an application 408.

When the application buffer is in cache, the application 408 may be enabled to transmit a receive message to the user space library 406. The user space library 406 may be enabled to post the pre-pinned buffer ID of the application receive buffer 132 on a receive queue (RQ) to the hardware 402. The hardware 402 may be enabled to process the generated TCP segment, look-up the buffer ID for the buffer address and place generated TCP packet segment directly in the application receive buffer 132 corresponding to the pre-pinned buffer ID. The hardware 402 may be enabled to direct memory access (DMA) the payload for the generated TCP segment to a RQ buffer 224. The hardware 402 may be enabled to generate a completion queue entry (CQE) in the completion queue 222 indicating reception of the generated TCP seg-ment. The user space library 406 may be enabled to poll the completion queue (CQ) 222. When the user space library 406 completes polling the CQ 222, the user space library 406 may request the hardware 402 that subsequent completion may be followed by an event notification.

Figure 5:
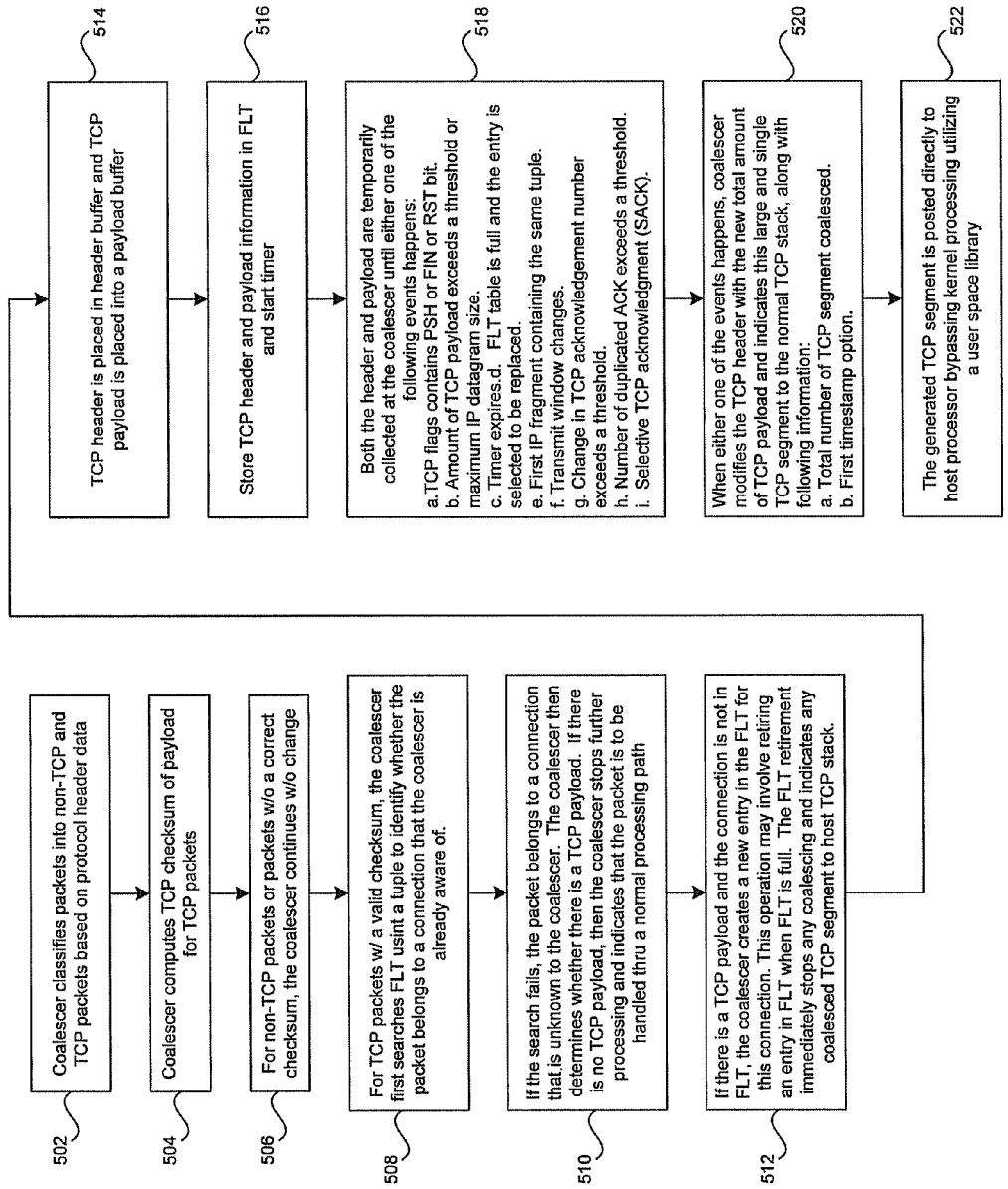
FIG. 5 is a flow chart illustrating exemplary steps for transparent TCP offload with a user space library, in accordance with an embodiment of the invention.

FIG. 5 is a flow chart illustrating exemplary steps for transparent TCP offload with a user space library, in accordance with an embodiment of the invention. Referring to FIG. 5, in step 502, for every packet received, the coalescer 131, for example, may classify the packets into non-TCP and TCP packets by examining the protocol headers. In step 504, for non-TCP packets or packet without correct checksum, the coalescer 131 may continue processing without change. In step 506, the coalescer 131 may compute the TCP checksum of the payload. In step 508, for TCP packets with valid checksum, the coalescer 131 first searches the flow lookup table (FLT) using a tuple comprising IP source address, IP destination address, source TCP port and destination TCP port, to determine whether the packet belongs to a connection that the coalescer 131 is already aware of.

In step 510, in instances where the search fails, this packet may belong to a connection that is not known to the coalescer 131. The coalescer 131 may determine whether there is any TCP payload. If there is no TCP payload, for example, pure TCP ACK, the coalescer 131 may stop further processing and allow processing of the packet through a normal processing path and add an entry in the FLT. In step 512, if there is TCP payload and the connection is not in the FLT, the coalescer 131 may create a new entry in the FLT for this connection. This operation may involve retiring an entry in the FLT when the FLT is full. The FLT retirement may immediately stop any further coalescing and provides an indication of any aggregated TCP segment to host TCP stack.

In step 514, the TCP header may be placed or merged into the header buffer, and the TCP payload may be placed into a payload buffer. In step 516, the TCP header and payload information may be stored in the FLT and a timer may be started. In step 518, the coalescer may determines if one of the following exemplary termination events has occurred:
a. TCP flags comprising PSH or FIN or RST bits.
b. An amount of TCP payload exceeds a threshold or maximum IP datagram size.
c. A timer expires.
d. A transmit window size changes.
e. A selective TCP acknowledgment (SACK).

In this regard, the PSH bit may refer to a control bit that indicates that a segment contains data that must be pushed through to the receiving user. The FIN bit may refer to a control bit that indicates that the sender will send no more data or control occupying sequence space. The RST bit may refer to a control bit that indicates a reset operation where the receiver should delete the connection without further interaction. The ACK bit may refer to a control bit that indicates that the acknowledgment field of the segment specifies the next sequence number the sender of this segment is expecting to receive, hence acknowledging receipt of all previous sequence numbers.

In step 520, when either one of these events happens, the coalescer 131 may modify the TCP header with the new total amount of TCP payload and indicates this large and single TCP segment to the normal TCP stack, along with a total number of TCP segments aggregated and/or a first timestamp option. In step 522, the generated TCP segment may be posted directly to hardware 402 or the host processor 124, thereby bypassing kernel 234 processing of the generated TCP segment utilizing a user space library 220.

The hardware stack that may be located on the NIC is adapted to take the packets off the wire and accumulate or aggregate them independent of the TCP stack running on the host processor. For example, the data portion of a plurality of received packets may be accumulated in the host memory until a single large TCP receive packet of, for example, 8K is created. Once the single large TCP receive packet gets generated, it may be transferred to the host for processing. In this regard, the hardware stack may be adapted to build state and context information when it recognizes the received TCP packets. This significantly reduces the computation intensive tasks associated with TCP stack processing. While the data portion of a plurality of received packets is being accumulated in the host memory, this data remains under the control of the NIC.

Although the handling of a single TCP connection is illustrated, the invention is not limited in this regard. Accordingly, various embodiments of the invention may provide support for a plurality of TCP connections over multiple physical networking ports.

Figure 6:
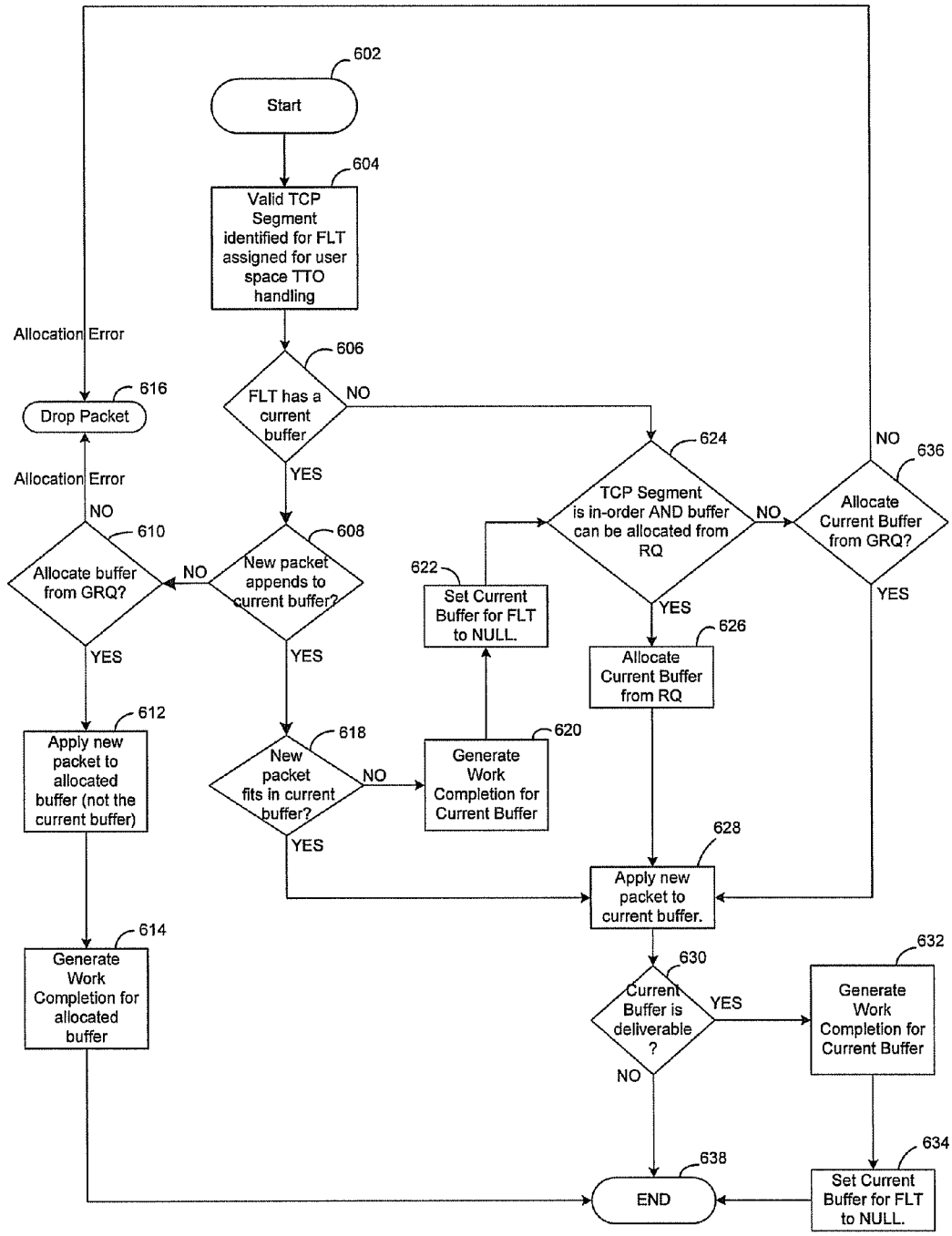
FIG. 6 is a flowchart illustrating exemplary steps for work request completion for transparent TCP offload with a user space library, in accordance with an embodiment of the invention.

FIG. 6 is a flowchart illustrating exemplary steps for work request completion for transparent TCP offload with a user space library, in accordance with an embodiment of the invention. Referring to FIG. 6, exemplary steps may begin at step 602. In step 604, a valid TCP segment that is identified by a flow lookup table (FLT) may be assigned for user space TTO handling. In step 606, it may be determined whether the FLT has a current buffer. The coalescer 111 may utilize a flow lookup table (FLT) to maintain information regarding current network flows for which TCP segments are being collected for aggregation. If the FLT has a current buffer, control passes to step 608.

In step 608, it may be determined whether new TCP packets append to a current buffer. If the new TCP packets do not append to a current buffer, control passes to step 610. In step 610, it may be determined whether a buffer may be allocated from the GRQ. If the buffer from GRQ cannot be allocated, an allocation error may be indicated and control passes to step 616. In step 616, the packet may be dropped. If the buffer from GRQ can be allocated, control passes to step 612. In step 612, the new packet may be applied to the allocated buffer. In step 614, a work completion entry may be generated for the allocated buffer. Control then passes to end step 638.

In step 608, if the new TCP packets appends to a current buffer, control passes to step 618. In step 618, it may be determined whether the new packet fits in the current buffer. If the new packet fits in the current buffer, control passes to step 628. In step 628, the new packet may be applied to the current buffer. If the new packet does not fit in the current buffer, control passes to step 620. In step 620, a work completion entry may be generated for the current buffer. In step 622, the current buffer for the FLT may be set to NULL. In step 624, it may be determined whether the TCP segment is in order and the buffer can be allocated from the RQ 224. If the TCP segment is not in order or the buffer cannot be allocated from the RQ 224, control passes to step 636. In step 636, it may be determined whether the current buffer may be allocated from a GRQ. If the current buffer may not be allocated from a GRQ, an allocation error may be indicated and control passes to step 616. In step 616, the packet may be dropped. If the current buffer may be allocated from a GRQ, control passes to step 628. If the TCP segment is in order and the buffer can be allocated from the RQ 224, control passes to step 626. In step 626, the current buffer may be allocated from the RQ 224.

In step 630, it may be determined whether the current buffer is deliverable. If the current buffer is deliverable, control passes to step 632. In step 632, a work completion entry may be generated for the current buffer. In step 634, the current buffer for FLT may be set to NULL. Control then passes to end step 638. If the current buffer is not deliverable, control passes to end step 638.

In accordance with an embodiment of the invention, a user-mode TTO transmit work request may present a pseudo-frame that may be translated by the hardware into multiple actual frames. A user-mode TTO receive work request may supply a buffer to receive a pseudo-frame that may represent one or more actual frames. When posting a user-mode TTO receive work request, the user space library 220 may not be able to predict the number of TCP segments coalesced in a single receive buffer. The user-mode TTO may support an RQ 224 and GRQ 228 and may allow buffers to come from the RQ 224 and/or the GRQ 228. This differs from conventional offload systems in which buffers can come from only a single queue.

In accordance with an embodiment of the invention, a method and system for transparent TCP offload with a user space library may include a network interface card (NIC) processor 130 that enables collection of TCP segments in the NIC without transferring state information to a host system 124. When an event occurs that terminates the collection of TCP segments, the coalescer 131 may generate a single aggregated TCP segment based on the collected TCP segments. The aggregated TCP segment may be posted directly to a user space library 220, thereby bypassing kernel processing of the aggregated TCP segment.

The host system 124 may enable determining whether at least one application buffer is registered for the generated new TCP segment. The NIC processor 130 may enable registration of at least one application buffer for the generated new TCP segment, if the generated new TCP segment is not cached in memory 126. The NIC processor 130 may enable pinning of the registered application buffer for the generated new TCP segment. The NIC processor 130 may enable posting of the pinned registered application buffer to the user space library 220. The NIC processor 130 may enable caching of at least a portion of the registered application buffer for the generated new TCP segment. The NIC processor 130 may enable utilization of at least a portion of the registered application buffer for subsequent requests to the user space library 220 by a target application 308. The NIC processor 130 may enable indication of receipt of the generated new TCP segment into a registered application buffer posted in at least one of: a receive queue (RQ) 224 and a general receive queue (GRQ) 228. The NIC processor 130 may enable generation of an event notification for the indication of the receipt of the generated new TCP segment.

Another embodiment of the invention may provide a machine-readable storage, having stored thereon, a computer program having at least one code section executable by a machine, thereby causing the machine to perform the steps as described above for transparent TCP offload with user space library.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling processing of network information, the method comprising:
posting a new transmission control protocol (TCP) segment to a user space library, bypassing kernel processing of said new TCP segment, wherein said new segment is generated without transferring state information regarding a particular network flow to a host processor.

2. The method according to claim 1, comprising generating said new TCP segment after a termination event occurs based on collecting one or more TCP segments received for said particular network flow.

3. The method according to claim 1, comprising registering at least one application buffer for said generated new TCP segment, if said generated new TCP segment is not cached in memory.

4. The method according to claim 3, comprising pinning and posting said registered said at least one application buffer for said generated new TCP segment to said user space library.

5. The method according to claim 4, comprising caching at least a portion of said registered at least one application buffer for said generated new TCP segment.

6. The method according to claim 5, comprising utilizing said cached said at least portion of said registered at least one application buffer for subsequent requests to said user space library by a target application.

7. The method according to claim 1, comprising indicating receipt of said generated new TCP segment into a registered application buffer posted in one or both of: a receive queue (RQ) and/or a general receive queue (GRQ).

8. A non-transitory machine-readable storage having stored thereon, a computer program having at least one code section for handling processing of network information, the at least one code section being executable by a machine for causing the machine to perform steps comprising:
posting a new transmission control protocol (TCP) segment to a user space library, bypassing kernel processing of said new TCP segment, wherein said new segment is generated without transferring state information regarding a particular network flow to a host processor.

9. The non-transitory machine-readable storage according to claim 8, wherein said at least one code section comprises code for generating said new TCP segment after a termination event occurs based on collecting one or more TCP segments received for said particular network flow.

10. The non-transitory machine-readable storage according to claim 8, wherein said at least one code section comprises code for registering at least one application buffer for said generated new TCP segment, if said generated new TCP segment is not cached in memory.

11. The non-transitory machine-readable storage according to claim 10, wherein said at least one code section comprises code for pinning and posting said registered said at least one application buffer for said generated new TCP segment to said user space library.

12. The non-transitory machine-readable storage according to claim 11, wherein said at least one code section comprises code for caching at least a portion of said registered at least one application buffer for said generated new TCP segment.

13. The non-transitory machine-readable storage according to claim 12, wherein said at least one code section comprises code for utilizing said cached said at least portion of said registered at least one application buffer for subsequent requests to said user space library by a target application.

14. The non-transitory machine-readable storage according to claim 8, wherein said at least one code section comprises code for indicating receipt of said generated new TCP segment into a registered application buffer posted in one or both of: a receive queue (RQ) and/or a general receive queue (GRQ).

15. A system for handling processing of network information, the system comprising:
one or more circuits that are operable to post a new transmission control protocol (TCP) segment to a user space library, bypassing kernel processing of said new TCP segment, wherein said new segment is generated without transferring state information regarding a particular network flow to a host processor.

16. The method according to claim 15, wherein said one or more circuits are operable to generate said new TCP segment after a termination event occurs based on collecting one or more TCP segments received for said particular network flow.

17. The method according to claim 15, wherein said one or more circuits are operable to register at least one application buffer for said generated new TCP segment, if said generated new TCP segment is not cached in memory.

18. The method according to claim 17, wherein said one or more circuits are operable to pin and post said registered said at least one application buffer for said generated new TCP segment to said user space library.

19. The method according to claim 18, wherein said one or more circuits are operable to cache at least a portion of said registered at least one application buffer for said generated new TCP segment.

20. The method according to claim 19, wherein said one or more circuits are operable to utilize said cached said at least portion of said registered at least one application buffer for subsequent requests to said user space library by a target application.

21. The method according to claim 15, wherein said one or more circuits are operable to indicate receipt of said generated new TCP segment into a registered application buffer posted in one or both of: a receive queue (RQ) and/or a general receive queue (GRQ).

* * * * *